US012712726B2

(12) United States Patent
Del Pino

(10) Patent No.: US 12,712,726 B2
(45) Date of Patent: Aug. 18, 2026

(54) METHODS AND SYSTEMS FOR UPDATABLE ENCRYPTION

(71) Applicant: PQShield Ltd, Oxford (GB)

(72) Inventor: Rafaël Del Pino, Gennevilliers (FR)

(73) Assignee: PQShield Ltd, Oxford (GB)

( * ) Notice: Subject to any disclaimer, the term of this patent is extended or adjusted under 35 U.S.C. 154(b) by 211 days.

(21) Appl. No.: 18/330,051

(22) Filed: Jun. 6, 2023

(65) Prior Publication Data

US 2023/0396432 A1 Dec. 7, 2023

Related U.S. Application Data

(63) Continuation of application No. PCT/GB2021/053300, filed on Dec. 15, 2021.

(30) Foreign Application Priority Data

Dec. 17, 2020 (GB) .................................... 2020036

(51) Int. Cl.
*H04L 9/08* (2006.01)

(52) U.S. Cl.
CPC .................................. *H04L 9/0891* (2013.01)

(58) Field of Classification Search
CPC .................................................... H04L 9/0891
USPC ........................................................ 380/277
See application file for complete search history.

(56) References Cited

U.S. PATENT DOCUMENTS 9,923,717 B2* 3/2018 Camenisch ........... H04L 9/0891
2015/0016606 A1* 1/2015 Omino .................. H04L 9/0869 380/46
2019/0306155 A1* 10/2019 Girdhar ............... H04L 63/0838
2020/0119915 A1* 4/2020 Yan ....................... H04L 9/0897
2021/0099290 A1* 4/2021 Tomlinson ................ H04L 9/14
2021/0176075 A1* 6/2021 Chu ...................... H04L 9/3247
2021/0409423 A1* 12/2021 Bhandari ............. H04L 63/126

OTHER PUBLICATIONS

XP058638302—Don't hesitate to share! a novel IoT data protection scheme based on BGN cryptosystem—Designing Interactive Systems Conference, Apr. 8, 2019; Jun. 23, 2019-Jun. 28, 2019 ACM, 2 Penn Plaza, Suite 701New YorkNY10121-0701USA—ISBN 978-1-4503-5850-7 ; ISBN 1-4503-5850-0—pp. 284-291—Author Halder Subir subir halder@math unipd it; Conti Mauro conti@math unipd it.

XP061035909—The Direction of Updatable Encryption does not Matter Much—vol. 20200528:141110, pp. 1-42—Author Yao Jiang.

XP047507704—(R)CCA Secure Updatable Encryption with Integrity Protection—Advances in Databases and Information Systems; [Lecture Notes in Computer Science; Lect. Notes Computer], 20190418 Springer International Publishing, Cham—ISBN 978-3-319-10403-4 ; ISBN 3-319-10403-9—vol. 11476 Chap.3, pp. 68-99—Author Klooß Michael; Lehmann Anja; Rupp Andy.

International Search Report dated Feb. 8, 2022 for PCT Application No. PCT/GB2021/053300.

* cited by examiner

*Primary Examiner* — Jacob Lipman
(74) *Attorney, Agent, or Firm* — EIP US LLP

(57) ABSTRACT

Described herein are methods and systems for updating encryption keys. The updating may comprise application of an update token to a key to generate a second key. The updating may comprise application of a second update token to the key to generate a third key. The key may be the same key in both update operations.

9 Claims, 6 Drawing Sheets

100

200

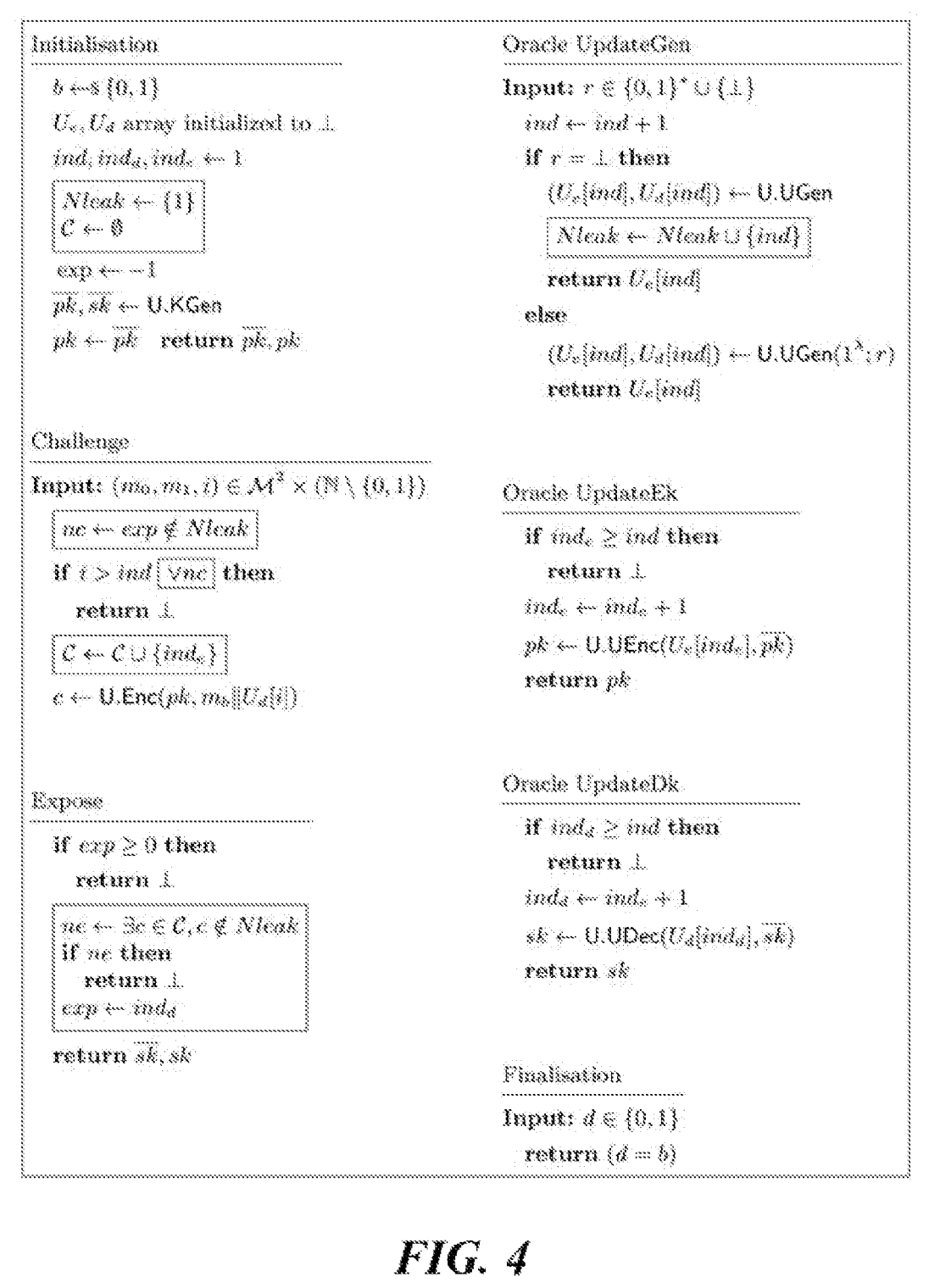

Initialisation $b \leftarrow\!\$\ \{0,1\}$
$U_e, U_d$ array initialized to $\perp$
$ind, ind_d, ind_e \leftarrow 1$
$\boxed{Nleak \leftarrow \{1\} \quad \mathcal{C} \leftarrow \emptyset}$
$\exp \leftarrow -1$
$\overline{pk}, \overline{sk} \leftarrow \mathsf{U.KGen}$
$pk \leftarrow \overline{pk}$ return $\overline{pk}, pk$ Challenge

Input: $(m_0, m_1, i) \in \mathcal{M}^2 \times (\mathbb{N} \setminus \{0,1\})$
$\boxed{nc \leftarrow exp \notin Nleak}$
if $i > ind$ $\boxed{\vee nc}$ then
  return $\perp$
$\boxed{\mathcal{C} \leftarrow \mathcal{C} \cup \{ind_e\}}$
$c \leftarrow \mathsf{U.Enc}(pk, m_b \| U_d[i])$ Expose if $exp \geq 0$ then
  return $\perp$
$\boxed{nc \leftarrow \exists c \in \mathcal{C}, c \notin Nleak}$
$\boxed{\textbf{if } nc \textbf{ then}}$
$\boxed{\textbf{return } \perp}$
$\boxed{exp \leftarrow ind_d}$
return $\overline{sk}, sk$ Oracle UpdateGen

Input: $r \in \{0,1\}^* \cup \{\perp\}$
$ind \leftarrow ind + 1$
if $r = \perp$ then
  $(U_e[ind], U_d[ind]) \leftarrow \mathsf{U.UGen}$
  $\boxed{Nleak \leftarrow Nleak \cup \{ind\}}$
  return $U_e[ind]$
else
  $(U_e[ind], U_d[ind]) \leftarrow \mathsf{U.UGen}(1^\lambda; r)$
  return $U_e[ind]$ Oracle UpdateEk if $ind_e \geq ind$ then
  return $\perp$
$ind_e \leftarrow ind_e + 1$
$pk \leftarrow \mathsf{U.UEnc}(U_e[ind_e], \overline{pk})$
return $pk$ Oracle UpdateDk if $ind_d \geq ind$ then
  return $\perp$
$ind_d \leftarrow ind_e + 1$
$sk \leftarrow \mathsf{U.UDec}(U_d[ind_d], \overline{sk})$
return $sk$ Finalisation

Input: $d \in \{0,1\}$
return $(d = b)$

*FIG. 4*

| $\mathsf{KGen}(1^\lambda)$ | $\mathsf{Enc}((a,b),m)$ | $\mathsf{Dec}(s,(u,v))$ |
|---|---|---|
| $a \leftarrow\!\!\$\ \mathcal{R}_q$ | $r \leftarrow \mathcal{D}_{\mathcal{R},\sigma}$ | $m = v - su \mod 2$ |
| $s \leftarrow \mathcal{D}_{\mathcal{R},\sigma}$ | $e \leftarrow \mathcal{D}_{\mathcal{R},\sigma}$ | **return** $m$ |
| $e \leftarrow \mathcal{D}_{\mathcal{R},\sigma}$ | $u := 2(ar)$ | |
| $b := as + e$ | $v := 2(br + e) + m$ | |
| **return** $(s,(a,b))$ | **return** $(u,v)$ | |

*FIG. 5*

| $\mathsf{U.KGen}(1^\lambda)$ | $\mathsf{U.Enc}(pk,\overline{pk},m)$ | $\mathsf{U.Dec}(sk,\overline{sk},c)$ |
|---|---|---|
| **return** $\mathsf{KGen}(1^\lambda)$ | $(pk',sk') \leftarrow \mathsf{U.KGen}(1^\lambda)$ | $(m\|sk') \leftarrow \mathsf{Dec}(sk,c)$ |
| | $c \leftarrow \mathsf{Enc}(pk,(m\|sk'))$ | **return** $(m,\overline{sk} \oplus_s sk')$ |
| | **return** $(c,\overline{pk} \oplus_e pk')$ | |

*FIG. 6*

METHODS AND SYSTEMS FOR UPDATABLE ENCRYPTION

CROSS-REFERENCE

This application is a continuation of International Patent Application No. PCT/GB2021/053300, filed Dec. 15, 2021, which claims the benefit of UK Patent Application No. GB 2020036.6, filed Dec. 17, 2020, all of which are incorporated herein by reference in their entirety.

BACKGROUND

The impeding advent of practicable large-scale quantum computing brings with it a number of security challenges, not the least of which is that some currently used encryption methods are not resilient to quantum computer-based attacks. As such, new encryption methods are being developed, but they tend to lack the maturity and depth of study of more established methods. Additionally, new encryption systems may have properties that may be different from those used in other encryption systems such as, for example, increased noise and a bounded number of updates.

SUMMARY

In an aspect, the present disclosure provides methods and systems for generating updated encryption and/or decryption keys. Though referred to herein as encryption keys, the methods and systems of the present disclosure may be used for decryption keys as well. An initial encryption key can be updated through use of an update token to generate an updated encryption key. The updated encryption key can be used in an encryption scheme to securely encrypt ciphertexts. The initial encryption key can be updated through use of a second update token to generate a second updated encryption key. The second updated encryption key can be used in place of the updated encryption key in the encryption scheme to securely encrypt ciphertexts.

By updating the initial encryption key instead of the updated encryption key to generate the second updated encryption key, a more secure encryption scheme can be realized where information leakage may be minimized. Additionally, noisier encryption schemes may be used, as the noise generated by an encryption key update may not propagate along the updated encryption keys. Further, insecure or corrupted update tokens may create fewer issues, as the lack of security or corruption may not propagate through the updated keys.

In another aspect, the present disclosure provides a computer-implemented method for updating an encryption key, comprising: (a) using a first update token to update the encryption key to generate a first updated encryption key; and (b) subsequent to (a), using a second update token to update the encryption key to generate a second updated encryption key, wherein the second update token is different than the first update token, and wherein the second updated encryption key is different than the first updated encryption key.

In some embodiments, the second updated encryption key is configured to be used to encrypt or decrypt a ciphertext. In some embodiments, the encryption key is a public key, a private key, or both. In some embodiments, the encryption key is an encryption key for a post-quantum encryption scheme. In some embodiments, the updated encryption key or the second updated encryption key is configured to be used by an encryption algorithm to encrypt a ciphertext. In some embodiments, the using the second update token comprises applying one or more operations from the update token to the encryption key. In some embodiments, the encryption key is a decryption key.

In another aspect, the present disclosure provides a system for updating an encryption key, comprising: one or more computer processors operatively coupled to computer memory, wherein the one or more computer processors are individually or collectively configured to (a) direct use of a first update token to update the encryption key to generate a first updated encryption key; and (b) subsequent to (a), direct use of a second update token to update the encryption key to generate a second updated encryption key, wherein the second update token is different than the first update token, and wherein the second updated encryption key is different than the first updated encryption key.

In another aspect, the present disclosure provides a computer-implemented method for encrypting a message, comprising: (a) providing a first public key; and (b) using the first public key to (i) generate a ciphertext, wherein the ciphertext comprises an encrypted message and a private key update token, and (ii) generate a second public key using a public key update token.

In some embodiments, the method further comprises (c) decrypting the ciphertext using a first private key, wherein the decrypting comprises generation of an updated private key generated by applying the private key update token to a second private key. In some embodiments, the private key update token is of a same type as the second private key. In some embodiments, the private key update token and the public key update token are a same update token. In some embodiments, the private key update token and the encrypted message are encrypted by a same encryption scheme. In some embodiments, the same encryption scheme is a ring learning with errors (RLWE) encryption scheme. In some embodiments, the second public key has a size of greater than 100 bytes. In some embodiments, the public key update token is of a same size as the first public key. In some embodiments, the method further comprises an encryption key, wherein the encryption key comprises at least two keys. In some embodiments, the at least two keys comprise the first public key and the second public key. In some embodiments, the public key update token comprises a secret key. In some embodiments, the public key update token is provided by a sender of the first ciphertext. In some embodiments, the public key update token is provided by a central server. In some embodiments, the method further comprises receiving a second update token. In some embodiments, the second update token is applied to the first public key to generate a third public key. In some embodiments, the third public key is configured to be used to generate a second ciphertext. In some embodiments, the first public key is generated using lattice-based cryptographic primitives.

In another aspect, the present disclosure provides a system for encrypting a message, comprising: one or more computer processors operatively coupled to computer memory, wherein the one or more computer processors are individually or collectively configured to (a) provide a first public key; and (b) direct use of the first public key to (i) generate a ciphertext, wherein the ciphertext comprises an encrypted message and a private key update token, and (ii) generate a second public key using an update token.

Another aspect of the present disclosure provides a non-transitory computer readable medium comprising machine executable code that, upon execution by one or more computer processors, implements any of the methods above or elsewhere herein.

Another aspect of the present disclosure provides a system comprising one or more computer processors and computer memory coupled thereto. The computer memory comprises machine executable code that, upon execution by the one or more computer processors, implements any of the methods above or elsewhere herein.

Additional aspects and advantages of the present disclosure will become readily apparent to those skilled in this art from the following detailed description, wherein only illustrative embodiments of the present disclosure are shown and described. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

INCORPORATION BY REFERENCE

All publications, patents, and patent applications mentioned in this specification are herein incorporated by reference to the same extent as if each individual publication, patent, or patent application was specifically and individually indicated to be incorporated by reference. To the extent publications and patents or patent applications incorporated by reference contradict the disclosure contained in the specification, the specification is intended to supersede and/or take precedence over any such contradictory material.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings (also "Figure" and "FIG." herein), of which:

FIG. 4 is an example schematic of the indistinguishability of the methods and systems as described elsewhere herein under chosen-plaintext attack.

FIG. 5 is an example of a tuple of algorithms configured to implement a ring learning with errors (RWLE) based public key encryption (PKE) scheme.

FIG. 6 is an example of an updatable RWLE based PKE scheme.

DETAILED DESCRIPTION

Figure 1:
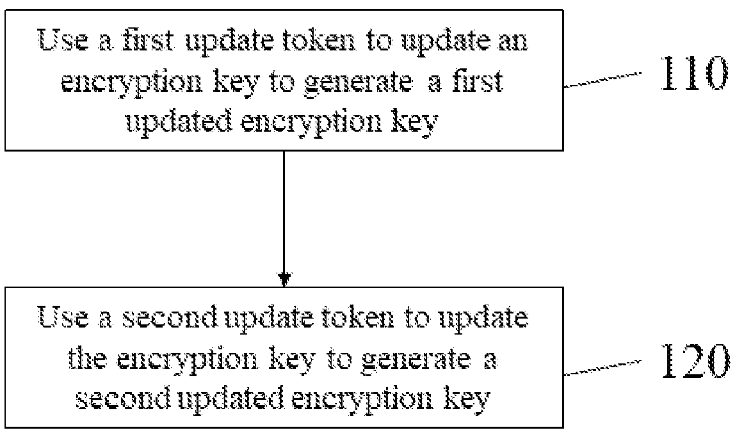
FIG. 1 is a flowchart of an example method for updating an encryption key.

While various embodiments of the invention have been shown and described herein, it will be obvious to those skilled in the art that such embodiments are provided by way of example only. Numerous variations, changes, and substitutions may occur to those skilled in the art without departing from the invention. It should be understood that various alternatives to the embodiments of the invention described herein may be employed.

Whenever the term "at least," "greater than," or "greater than or equal to" precedes the first numerical value in a series of two or more numerical values, the term "at least," "greater than" or "greater than or equal to" applies to each of the numerical values in that series of numerical values. For example, greater than or equal to 1, 2, or 3 is equivalent to greater than or equal to 1, greater than or equal to 2, or greater than or equal to 3.

Whenever the term "no more than," "less than," or "less than or equal to" precedes the first numerical value in a series of two or more numerical values, the term "no more than," "less than," or "less than or equal to" applies to each of the numerical values in that series of numerical values. For example, less than or equal to 3, 2, or 1 is equivalent to less than or equal to 3, less than or equal to 2, or less than or equal to 1.

The term "public key," as used herein, generally refers to an encryption key that is used for encryption. The public key may not be kept secret. The public key may be accessed by a user (e.g., a user sending a message), a service (e.g., a software running on an appropriately configured computer), or any other sender/receiver of an encrypted object. The public key may be used to encrypt a plaintext into a ciphertext. For example, a user Alice can use the public key of a user Bob to encrypt a plaintext that can then be decrypted by Bob.

The terms "secret key" or "private key," as used herein, generally refers to an encryption key used for decryption. The private key may be kept secret a user (e.g., a user sending a message), a service (e.g., a software running on an appropriately configured computer), or any other sender/receiver of an encrypted object. The private key may be used to decrypt a ciphertext into a plaintext. The secret key may be a pseudo-random secret key, a Gaussian secret key, or the like.

The term "encryption scheme," as used herein, generally refers a method of encrypting and decrypting. The encryption scheme may be a lattice-based scheme. Examples of encryption schemes may be asymmetric key encryption (e.g., public-key encryption), symmetric key encryption (e.g., advanced encryption standard (AES)), Round5, Saber, NewHope, Kyber, FrodoKEM, and Supersingular Isogeny Key Encapsulation (SIKE). The encryption scheme may be a key encapsulation mechanism (KEM). The encryption scheme may be a code-based encryption scheme. Examples of code-based encryption schemes may be (Classic) McEliece, BIKE, ROLLO, HQC, RQC, or the like. Other examples of lattice-based, code-based, or other encryption schemes can be found in the National Institutes for Standards and Testing (NIST) Post-Quantum Cryptography project files, such as the "Status Report on the First Round of the NIST Post-Quantum Cryptography Standardization Process" by Alagic et al. published Jan. 31, 2019 (DOI: 10.6028/NISTIR.8240), which is incorporated by reference in its entirety. The encryption scheme may be a public key encryption scheme (PKE). The encryption scheme may be a symmetric encryption scheme (e.g., AES), an asymmetric encryption scheme, or the like.

The term "ciphertext," as used herein, generally refers to an encrypted text. The encryption may be encryption performed by an algorithm. The text may be numbers (e.g., binary representations), letters, words, or the like, or any combination thereof. A ciphertext may be an encrypted plaintext. A ciphertext may be an encrypted message. A multi-ciphertext may be one or more ciphertexts in a same package.

The term "token," as used herein, generally refers to a construct comprising at least one value. A token may be of a same format as a key. A token may be, for example, a polynomial comprising a plurality of polynomial pre-factors, a matrix, a random exponent in a multiplicative group, a point on an elliptic curve, or the like.

The present disclosure provides a computer-implemented methods and systems for updating an encryption key. A computer-implemented method for updating an encryption key may comprise using a first update token to update the encryption key to generate a first updated encryption key. Subsequently, a second update token may be used to update the encryption key to generate a second updated encryption key. The second update token may be different from the first update token. The second updated encryption key may be different than the first updated encryption key.

A system for updating an encryption key may comprise one or more computer processors operatively coupled to computer memory. The one or more computer processors may be individually or collectively configured to direct use of a first update token to update the encryption key to generate a first updated encryption key. The one or more computer processors may be individually or collectively configured to subsequently direct use of a second update token to update the encryption key to generate a second updated encryption key. The second update token may be different than the first update token. The second updated encryption key may be different from the first updated encryption key. Though described herein with respect to a method, the following is applicable to a system as well.

FIG. 1 is a flowchart of an example method 100 for updating an encryption key. In an operation 110, the method 100 may comprise using a first update token to update an encryption key to generate a first updated encryption key.

The encryption key may be a public key. For example, a public key can be updated by an update token to generate an updated public key. The encryption key may be a private key. The encryption key may be both a public key and a private key. The encryption key may be a symmetric key encryption key. An update token may comprise information configured such that, when applied to an encryption key, updates the encryption key to be a different encryption key. An update token may be of a same class as an encryption key it is configured to update. For example, an encryption key comprising a plurality of numbers can have an update token comprising a plurality of numbers. In another example, an encryption key comprising 256 1 or 0 values can have an update token comprising 256 1 or 0 values. In another example, an encryption key comprising an $n^{th}$ degree polynomial can have an update token comprising another $n^{th}$ degree polynomial. The update token may be of a different class as an encryption key. For example, an update token can be a seed for a pseudo-random generator configured to generate an update for an encryption key. The encryption key may be an encryption key for a post-quantum encryption scheme. A post-quantum encryption scheme may be an encryption scheme as described elsewhere herein. For example, the encryption scheme can be Classic McEliece.

In another operation 120, the method 100 may comprise using a second update token to update the encryption key to generate a second updated encryption key. Operation 120 may occur subsequent to operation 110. The second update token may be different from the first update token. The second updated encryption key may be different from the first updated encryption key. For example, the second updated encryption key can be of a same space (e.g., dimension) as the first encryption key but comprise different values from the first encryption key. The encryption key may be the same encryption key as used in operation 110 to generate the first updated encryption key. For example, a same initial encryption key may be used for generating both the first and the second updated encryption keys. By using the encryption key to generate the second updated encryption key instead of using the first updated encryption key, noise and error propagation can be reduced and encryption keys of arbitrary size can be utilized. For example, in a serial update scheme where second updated encryption keys are generated from first updated encryption keys, if an update process introduces a factor of 1 noise into the updated encryption key, after 100 updates the nose can be at a factor of 100. In another example, for an update scheme where second updated encryption keys are generated from encryption keys, the noise factor is introduced once per update, so after 100 updates the noise factor is still 1. In addition, a serial update scheme used with a noisy encryption scheme (e.g., RLWE) may be insecure due to information leakage. Conversely, for an update scheme where second updated encryption keys are generated from encryption keys, noisy encryption may be used without such information leakage.

The second updated encryption key may be configured to be used to encrypt or decrypt a ciphertext. For example, where the encryption key is a secret key, the second updated encryption key can be used to decrypt a ciphertext. The second updated encryption key may be configured to encrypt or decrypt a different ciphertext from the first updated encryption key. For example, a system can use the first updated encryption key to generate a first ciphertext, and the system can use the second updated encryption key to generate a second ciphertext. In this example, if an attacker gained access to the first ciphertext, the attacker may be unable to access the second ciphertext because the encryption key is changed. The updated encryption key and/or the second updated encryption key may be configured to be used by an encryption algorithm to encrypt a ciphertext.

The using the second update token may comprise applying one or more operations from the update token to the encryption key. Examples of operations include, but are not limited to, addition, multiplication, factorization, exponentiation, modulo operations, integrations, derivations, or the like, or any combination thereof. For example, using the second update token may comprise multiplying pre-factors of polynomial equations. In another example, using the second update token may comprise calculating the modulus of a value.

In another aspect, the present disclosure provides a system for updating an encryption key. The system may comprise one or more computer processors operatively coupled to computer memory. The one or more computer processors may be individually or collectively configured to direct use of a first update token to update the encryption key to generate a first updated encryption key. The one or more computer processors may be individually or collectively configured to subsequently direct use of a second update token to update the encryption key to generate a second updated encryption key. The second update token may be different from the first update token. The second updated encryption key may be different from the first updated encryption key.

In another aspect, the present disclosure provides a computer-implemented method for encrypting a message. The method may comprise providing a first public key. The first public key may be used to generate a ciphertext. The ciphertext may comprise an encrypted message and a private key update token. A second public key may be generated using a public key update token.

Figure 2:
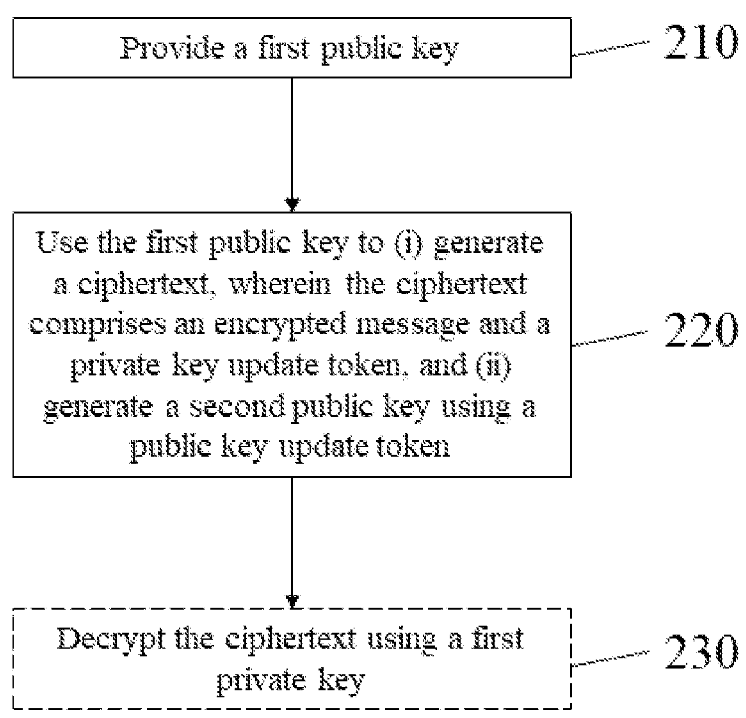
FIG. 2 is a flow chart of a process for encrypting a message.

FIG. 2 is a flow chart of a process 200 for encrypting a message. In an operation 210, the process 200 may comprise providing a first public key. The first public key may be a public key as described elsewhere herein. Though described herein with respect to a public key and generating a ciphertext, the process 200 may also be applied to a private key and the decryption of a ciphertext.

In another operation 220, the process 200 may comprise using the first public key to generate a ciphertext and generate a second public key using a public key update token. The ciphertext may comprise an encrypted message and a private key update token.

The private key update token and the encrypted message may be encrypted by a same encryption scheme. The encryption scheme may be an encryption scheme as described elsewhere herein. For example, the encryption scheme may be a ring learning with errors (RLWE) encryption scheme. The encryption of the update token using the same encryption scheme as the message may provide for a secure encryption while not being constrained by the size limitations of the encryption scheme.

The public key may have a size of at least about 1, 5, 10, 50, 100, 500, 1,000, 5,000, or more bytes. The public key may have a size of at most about 5,000, 1,000, 500, 100, 50, 10, 5, or less bytes. The public key update token may be of a same size as the first public key. For example, both the public key update token and the public key can be polynomials of the same rank. The process 200 may comprise an encryption key. The encryption key may comprise at least two keys. For example, the encryption key can comprise a first encryption key and a second encryption key generated by application of an encryption key update token to the first encryption key. The at least two keys may comprise the first public key and the second public key.

The public key update token may comprise a secret key. The secret key may be a secret key of the same type as the public key. For example, the secret key can be a matrix of the same dimensions as a matrix public key. The secret key may be different from an encryption key. For example, the secret key may be a secret update token. The public key update token may be provided by a sender of the first ciphertext. For example, the sender may update the sender's public key during the generation of the ciphertext as described elsewhere herein, and the recipient of the ciphertext may update their secret key subsequent to decrypting the ciphertext using the decrypted secret update token. The public key update token may be provided by a recipient of the first ciphertext. For example, the recipient may decrypt the ciphertext and update their secret key as described elsewhere herein, and the sender can then update their public key based on the recipient's update. The public key update token may be provided by a central server. The server may be a decentralized (e.g., cloud) server. The server may comprise one or more processors configured to implement computer code to implement the process 200. The central server may be configured to store the public and/or private keys for one or more users. For example, the server can be a credential management server.

The process 200 may comprise receiving a second update token. The second update token may be a public key update token, a private key update token, or both. The second update token may be of a same type as the private key update token and/or the public key update token. The second update token may be applied to the first public key to generate a third public key. The third public key may be used to generate a second ciphertext. The first public key may be updated at least about 1, 2, 3, 4, 5, 6, 7, 8, 9, 10, 15, 25, 50, 75, 100 or more times in this way. The first public key may be updated at least about 100, 75, 50, 25, 15, 10, 9, 8, 7, 6, 5, 4, 3, 2, or less times in this way. The first public key may be generated using lattice-based cryptographic primitives. For example, the first public key can be generated as a part of a lattice-based cryptographic scheme. The first public key may be generated by a post-quantum cryptography scheme as described elsewhere herein.

In an optional operation 230, the process 200 may comprise decrypting the ciphertext using a first private key. The decrypting may comprise generation of an updated private key generated by applying the private key update token to a second private key. The private key update token may be of a same type as the second private key. For example, when the second private key is an n-dimensional polynomial, the private key update token can be a different n-dimensional polynomial. The private key update token and the public key update token may be a same update token. For example, the private key and the public key can both be updated by a same update token. The private key update token and the public key update token may be different update tokens. For example, a first update token can be the private key update token and a second update token can be the public key update token.

In another aspect, the present disclosure provides a system for encrypting a message. The system may comprise one or more computer processors operatively coupled to computer memory. The one or more computer processors may be individually or collectively configured to provide a first public key. The one or more computer processors may be individually or collectively configured to direct use of the first public key to generate a ciphertext and generate a second public key using an update token. The ciphertext may comprise an encrypted message and a private key update token.

Figure 3:
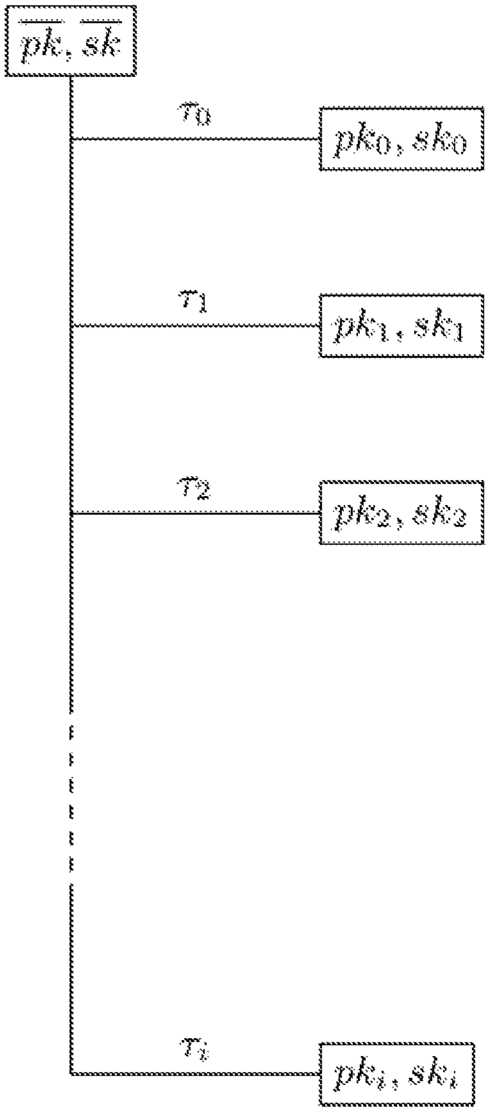
FIG. 3 is an example of a parallel key update scheme.

FIG. 3 is an example of a parallel key update scheme. The parallel key update scheme may be an update scheme as described elsewhere herein (e.g., FIGS. 1-2). The parallel key update scheme may comprise an initial public key $\overline{pk}$ and an initial private key $\overline{sk}$. An update token $\tau_1$ can be applied to the initial public and private keys to generate $pk_1$ and $sk_1$, respectively. Subsequently, a second update token $\tau_2$ can be applied to the initial public and private keys to generate $pk_2$ and $sk_2$, respectively. By applying the second update token to the initial public and private keys, errors (e.g., noise) can be reduced and the keys can be updated more times than if the new keys were generated sequentially. The process of updating the initial public and private keys can be repeated a number of times as represented by application of the $i^{th}$ update token $\tau_i$ to generate $pk_i$ and $sk_i$. A benefit of updating in this way may be a reduction in the noise propagated through updated keys, and thus a longevity of the update scheme. FIG. 4 is an example schematic of the indistinguishability of the methods and systems as described elsewhere herein under chosen-plaintext attack. The methods and systems described elsewhere herein may be indistinguishable under chosen plaintext attack. The methods and systems described elsewhere herein may be indistinguishable under chosen ciphertext attack.

Computer Systems

Figure 7:
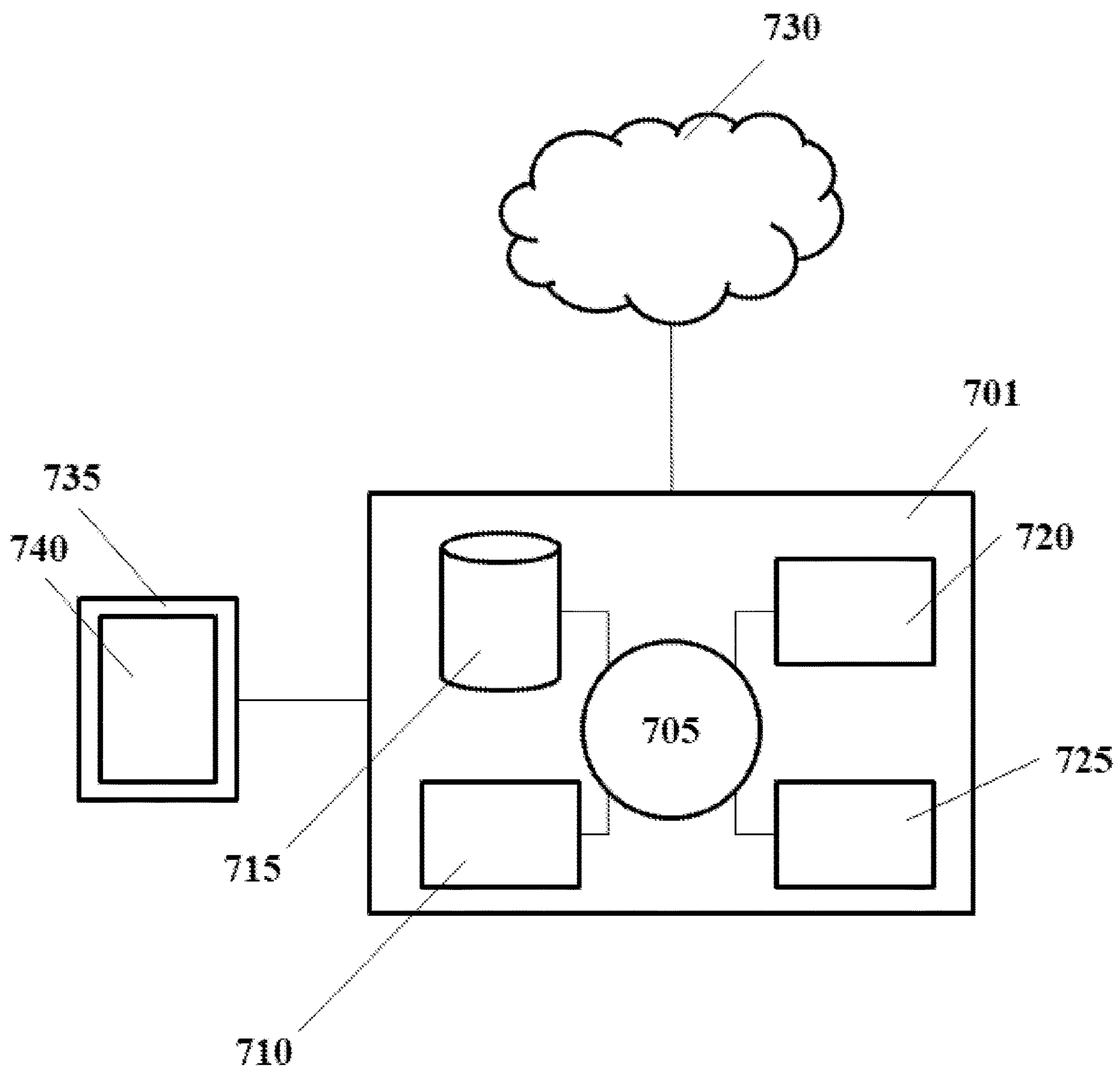
FIG. 7 shows a computer system that is programmed or otherwise configured to implement methods provided herein.

The present disclosure provides computer systems that are programmed to implement methods of the disclosure. FIG. 7 shows a computer system 701 that is programmed or otherwise configured to implement methods described elsewhere herein. The computer system 701 can regulate various aspects of the present disclosure, such as, for example, updating one or more encryption keys. The computer system 701 can be an electronic device of a user or a computer system that is remotely located with respect to the electronic device. The electronic device can be a mobile electronic device. The computer system 1101 may be a non-classical computer system (e.g., a quantum computer system).

The computer system 701 includes a central processing unit (CPU, also "processor" and "computer processor" herein) 705, which can be a single core or multi core processor, or a plurality of processors for parallel processing. The computer system 701 also includes memory or memory location 710 (e.g., random-access memory, read-only memory, flash memory), electronic storage unit 715 (e.g., hard disk), communication interface 720 (e.g., network adapter) for communicating with one or more other systems, and peripheral devices 725, such as cache, other memory, data storage and/or electronic display adapters. The memory 710, storage unit 715, interface 720 and peripheral devices 725 are in communication with the CPU 705 through a communication bus (solid lines), such as a motherboard. The storage unit 715 can be a data storage unit (or data repository) for storing data. The computer system 701 can be operatively coupled to a computer network ("network") 730 with the aid of the communication interface 720. The network 730 can be the Internet, an internet and/or extranet, or an intranet and/or extranet that is in communication with the Internet. The network 730 in some cases is a telecommunication and/or data network. The network 730 can include one or more computer servers, which can enable distributed computing, such as cloud computing. The network 730, in some cases with the aid of the computer system 701, can implement a peer-to-peer network, which may enable devices coupled to the computer system 701 to behave as a client or a server.

The CPU 705 can execute a sequence of machine-readable instructions, which can be embodied in a program or software. The instructions may be stored in a memory location, such as the memory 710. The instructions can be directed to the CPU 705, which can subsequently program or otherwise configure the CPU 705 to implement methods of the present disclosure. Examples of operations performed by the CPU 705 can include fetch, decode, execute, and writeback.

The CPU 705 can be part of a circuit, such as an integrated circuit. One or more other components of the system 701 can be included in the circuit. In some cases, the circuit is an application specific integrated circuit (ASIC).

The storage unit 715 can store files, such as drivers, libraries and saved programs. The storage unit 715 can store user data, e.g., user preferences and user programs. The computer system 701 in some cases can include one or more additional data storage units that are external to the computer system 701, such as located on a remote server that is in communication with the computer system 701 through an intranet or the Internet.

The computer system 701 can communicate with one or more remote computer systems through the network 730. For instance, the computer system 701 can communicate with a remote computer system of a user. Examples of remote computer systems include personal computers (e.g., portable PC), slate or tablet PC's (e.g., Apple® iPad, Samsung® Galaxy Tab), telephones, Smart phones (e.g., Apple® iPhone, Android-enabled device, Blackberry®), or personal digital assistants. The user can access the computer system 701 via the network 730.

Methods as described herein can be implemented by way of machine (e.g., computer processor) executable code stored on an electronic storage location of the computer system 701, such as, for example, on the memory 710 or electronic storage unit 715. The machine executable or machine readable code can be provided in the form of software. During use, the code can be executed by the processor 705. In some cases, the code can be retrieved from the storage unit 715 and stored on the memory 710 for ready access by the processor 705. In some situations, the electronic storage unit 715 can be precluded, and machine-executable instructions are stored on memory 710.

The code can be pre-compiled and configured for use with a machine having a processer adapted to execute the code, or can be compiled during runtime. The code can be supplied in a programming language that can be selected to enable the code to execute in a pre-compiled or as-compiled fashion.

Aspects of the systems and methods provided herein, such as the computer system 701, can be embodied in programming. Various aspects of the technology may be thought of as "products" or "articles of manufacture" typically in the form of machine (or processor) executable code and/or associated data that is carried on or embodied in a type of machine readable medium. Machine-executable code can be stored on an electronic storage unit, such as memory (e.g., read-only memory, random-access memory, flash memory) or a hard disk. "Storage" type media can include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer into the computer platform of an application server. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium, such as computer-executable code, may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the databases, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a ROM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a processor for execution.

The computer system 701 can include or be in communication with an electronic display 735 that comprises a user interface (UI) 740 for providing, for example, programming interfaces. Examples of UI's include, without limitation, a graphical user interface (GUI) and web-based user interface.

Methods and systems of the present disclosure can be implemented by way of one or more algorithms. An algorithm can be implemented by way of software upon execution by the central processing unit 705. The algorithm can, for example, implement one or more update algorithms as described herein.

EXAMPLES

The following examples are illustrative of certain systems and methods described herein and are not intended to be limiting.

Example 1—Use of a Lattice-Based Public Key Encryption Scheme with Arbitrary Secrets FIG. 5 is an example of a tuple of algorithms configured to implement a ring learning with errors (RWLE) based public key encryption (PKE) scheme. In a keygen operation KGen, a first value a can be selected at random from the ring $R_q$ while a secret key s can be sampled according to the distribution $D_{R,\sigma}$ and a second value e can be selected from a probability distribution $D_{R,\sigma}$. The ring $R_q$ can be a ring of polynomials of degree n taken modulo an integer q. The probability distribution $D_{R,\sigma}$ can be an error for a learning with errors encryption scheme. The selection may be random, pseudo-random, or the like, or any combination thereof. The probability distribution may be configured to introduce noisy randomness into the encryption scheme, thereby increasing the resistance of the encryption scheme to quantum computer based attacks. The objects a, s, and e may be combined to form b, thus generating the key set (s, (a,b)).

Subsequent to the keygen operation, an encryption operation Enc can generate r and e from probability distributions. The probability distributions may be the same as the probability distribution used to generate e. The probability distributions may be different from the probability distributions used to generate e. The encryption operation can be used to generate a ciphertext (u, v) comprising a message m as shown in FIG. 5. The message may be retrieved from the ciphertext as shown in the decryption operation Dec.

FIG. 6 is an example of an updatable RWLE based PKE scheme. Though described with respect to a RWLE scheme, the PKE scheme can be used with any scheme where there is an internal law for public and secret keys. The keygen operation U.KGen may be a same keygen operation as described in FIG. 5. The encryption operation U.Enc may generate a public key update token pk' and a secret key update token sk'. The public key update token and the private key update token may be generated in a same way as a keygen operation. Using a second public key pk and a message m concatenated with the secret key update token sk', the encryption operation can use Enc from FIG. 5 to generate an encrypted ciphertext c, as well as an updated public key $\overline{pk}\oplus_e pk'$, generated from the first public key $\overline{pk}$ and the public key update token. The operator $\oplus$ can be a law governing interaction in the encryption scheme, with $\oplus_e$ being the law over the public key space and $\oplus_s$ being the law over the secret key space. Examples of laws include, but are not limited to, multiplication for a Diffie-Hellman scheme or a sum in an elliptic curve scheme. The law may be external (e.g., the product of keys is not necessarily a key that may be obtained by the KGen algorithm). If a new public key were to be generated, the public key for encrypting the ciphertext can be $\overline{pk}\oplus_e pk'$ while the new public key can be $\overline{pk}\oplus_e pk''$, where pk" is another public key update token.

A decryption operation U.Dec can comprise use of a secret key sk to decrypt the ciphertext c to recover the message m concatenated with the secret key update token sk'. The message may then be taken and used as predetermined, while the secret key update token can be applied to the first secret key $\overline{sk}$ to generate an updated secret key. If another ciphertext were to be received, the secret key $\overline{sk}\oplus_s sk'$ can be used to decrypt the ciphertext, and a new updated secret key $\overline{sk}\oplus_s sk''$ can be generated.

While preferred embodiments of the present invention have been shown and described herein, it will be obvious to those skilled in the art that such embodiments are provided by way of example only. It is not intended that the invention be limited by the specific examples provided within the specification. While the invention has been described with reference to the aforementioned specification, the descriptions and illustrations of the embodiments herein are not meant to be construed in a limiting sense. Numerous variations, changes, and substitutions will now occur to those skilled in the art without departing from the invention. Furthermore, it shall be understood that all aspects of the invention are not limited to the specific depictions, configurations or relative proportions set forth herein which depend upon a variety of conditions and variables. It should be understood that various alternatives to the embodiments of the invention described herein may be employed in practicing the invention. It is therefore contemplated that the invention shall also cover any such alternatives, modifications, variations or equivalents. It is intended that the following claims define the scope of the invention and that methods and structures within the scope of these claims and their equivalents be covered thereby.

What is claimed is:

1. A computer-implemented method for updating an encryption key, wherein the encryption key is configured to be used to encrypt a plaintext into a ciphertext or to decrypt a ciphertext into a plaintext, the method comprising:

(a) processing a first update token together with said encryption key to update said encryption key, thereby generating a first updated encryption key; and (b) subsequent to (a), processing a second update token together with said encryption key to update said encryption key, thereby generating a second updated encryption key, wherein said second update token is different than said first update token, and wherein said second updated encryption key is different than said first updated encryption key.

2. The method of claim 1, wherein said second updated encryption key is configured to be used to encrypt or decrypt a ciphertext.

3. The method of claim 1, wherein said encryption key is a public key, a private key, or both.

4. The method of claim 1, wherein said encryption key is an encryption key for a post-quantum encryption scheme.

5. The method of claim 1, wherein said updated encryption key or said second updated encryption key is configured to be used by an encryption algorithm to encrypt a ciphertext.

6. The method of claim 1, wherein said using said second update token comprises applying one or more operations from said update token to said encryption key.

7. The method of claim 1, wherein said encryption key is a decryption key.

8. A system for updating an encryption key, wherein the encryption key is configured to be used to encrypt a plaintext into a ciphertext or to decrypt a ciphertext into a plaintext, the system comprising:

one or more computer processors operatively coupled to computer memory, wherein said one or more computer processors are individually or collectively configured to (a) direct processing of a first update token together with said encryption key to update said encryption key, thereby generating a first updated encryption key; and (b) subsequent to (a), direct processing of a second update token together with said encryption key to update said encryption key, thereby generating a second updated encryption key, wherein said second update token is different than said first update token, and wherein said second updated encryption key is different than said first updated encryption key.

9. A non-transitory computer-readable medium comprising machine executable code that, upon execution by a processor, causes the processor to perform a method for updating an encryption key, wherein the encryption key is configured to be used to encrypt a plaintext into a ciphertext or to decrypt a ciphertext into a plaintext, the method comprising:

(a) processing a first update token together with said encryption key to update said encryption key, thereby generating a first updated encryption key; and (b) subsequent to (a), processing a second update token together with said encryption key to update said encryption key, thereby generating a second updated encryption key, wherein said second update token is different than said first update token, and wherein said second updated encryption key is different than said first updated encryption key.

* * * * *